(12) United States Patent
Hiroki

(10) Patent No.: US 8,898,242 B2
(45) Date of Patent: Nov. 25, 2014

(54) APPARATUS AND METHOD OF CONTROLLING THE SAME IN A SYSTEM FOR COMMUNICATIONS BETWEEN A PRIORITY TERMINAL AND A NON-PRIORITY TERMINAL

(75) Inventor: Shigeru Hiroki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 12/818,052

(22) Filed: Jun. 17, 2010

(65) Prior Publication Data

US 2010/0325234 A1 Dec. 23, 2010

(30) Foreign Application Priority Data

Jun. 23, 2009 (JP) .................................. 2009-149060

(51) Int. Cl.
*G06F 15/16* (2006.01)
*H04W 72/12* (2009.01)
*H04W 74/08* (2009.01)

(52) U.S. Cl.
CPC ...... *H04W 72/1247* (2013.01); *H04W 74/0808* (2013.01)
USPC ....................................................... 709/207

(58) Field of Classification Search
None
See application file for complete search history.

(56) References Cited

U.S. PATENT DOCUMENTS

| 5,642,488 | A * | 6/1997 | Lonsinger et al. | 710/104 |
| 6,292,488 | B1* | 9/2001 | Filgate | 370/401 |
| 2004/0073674 | A1* | 4/2004 | Vergnaud et al. | 709/226 |
| 2007/0112970 | A1* | 5/2007 | Kihara et al. | 709/230 |
| 2008/0168136 | A1* | 7/2008 | Choi | 709/204 |
| 2009/0049180 | A1* | 2/2009 | Ei et al. | 709/227 |

FOREIGN PATENT DOCUMENTS

| JP | 57-202159 A | 12/1982 |
| JP | 2002-247051 A | 8/2002 |
| JP | 2008-079045 A | 4/2008 |
| JP | 2008-301075 A | 12/2008 |

OTHER PUBLICATIONS

"TransferJet(TM) Overview Whitepaper"TransferJet Consortium,Spring 2009,http://www.transferjet.org/tj/transferjet_whitepaper.pdf.
Office Action issued on Jan. 8, 2013 in counterpart Japanese Application No. 2009-149060.

* cited by examiner

*Primary Examiner* — Brian P Whipple
(74) *Attorney, Agent, or Firm* — Carter, DeLuca, Farrell & Schmidt, LLP

(57) ABSTRACT

A data communication control is realized in a system in which a priority terminal is shorter than a non-priority terminal in a standby time required until the terminal starts data communication after detecting that a communication medium is idle. An apparatus operating as the priority terminal determines an amount of data to be transmitted from the apparatus, and performs control for causing another apparatus operating as the non-priority terminal according to the determined amount of data.

20 Claims, 10 Drawing Sheets

APPARATUS AND METHOD OF CONTROLLING THE SAME IN A SYSTEM FOR COMMUNICATIONS BETWEEN A PRIORITY TERMINAL AND A NON-PRIORITY TERMINAL

BACKGROUND OF THE INVENTION

1. Field of the Invention

The present invention relates to communication control in a communication system in which a priority terminal is shorter than a non-priority terminal in a standby time.

2. Description of the Related Art

The previous allocation of wireless resources such as time and frequency used for transmission and reception in performing wireless communication between two apparatuses can be wasteful. For this reason, the IEEE 802.11 wireless LAN (hereinafter, referred to as "wireless LAN"), for example, uses a method of the Carrier Sense Multiple Access with Collision Avoidance (CSMA/CA) in which transmission rights are acquired on a first-come-first-served basis if a carrier is not detected.

In a wireless LAN, inter frame space (IFS), which is a standby time until which own data can be transmitted after it is detected that the transmission of previous data is finished, is changed according to the kinds of data to avoid the collision of data, thereby preferentially transmitting ACK. Randomly setting a back-off time required before the start of data transmission (random back off) avoids the collision of data similar in priority.

Japanese Patent Application Laid-Open No. 2002-247051 discusses a technique in which the IFS is controlled to preferentially transmit a packet small in data size. Japanese Patent Application Laid-Open No. 2008-301075 discusses a technique in which a random back-off control is further improved to reduce the probability that a collision occurs.

In recent years, non-contact communication (proximity wireless communication) such as near field communication (NFC) and TransferJet (registered trademark) has appeared. The non-contact communication is very short in communication distance, and is controlled so that communicating apparatus are made close to each other in several centimeters (for example, 10 cm or less for NFC, or 3 cm or less for TransferJet) to establish a radio link, and the communicating apparatuses are kept away from each other to cut off the radio link.

In the TransferJet, it is assumed that the apparatuses perform data communication on a one-to-one basis with each other, and a white paper describing use cases is currently published ("TransferJet™ Overview Whitepaper" Transfer-Jet Consortium, 2009). The white paper discloses that users make their apparatuses close to each other to enable sharing data.

For example, a method may be conceived in which a user performs an operation such as the selection of transmission data by its own apparatus and then brings it close to another apparatus to perform data communication for the purpose of sharing data using TransferJet. This is because it is difficult for the non-contact communication like the TransferJet to perform an operation such as the selection of transmission data with the connection of the radio link maintained because only a slight displacement of the apparatuses in the distance therebetween toward the outside of a communication range breaks the radio link therebetween.

The white paper does not deal with how the control of data transmission/reception is performed if both apparatuses are brought close to each other while selections of transmission data are completed in both apparatuses.

As a method for controlling data communication in that case, a method is conceived in which the CSMA/CA method is applied, as is the case with the wireless LAN, for example, to start data transmission on a first-come-first-served basis. However, in this case, until one apparatus previously acquiring transmission right finishes transmitting data, the other apparatus cannot transmit data.

If the other apparatus does not quickly start transmitting data, the user misjudges it as a failure in communication, and can perform unnecessary operations such as operating the apparatus or performing transmission operation again. If the transmission of data is not started even after a predetermined time period passes, it may be detected as a time-out error depending on the application of the other apparatus. If the amount of data in the apparatus previously acquiring transmission right is large in particular, such a problem probably occurs.

SUMMARY OF THE INVENTION

According to an aspect of the present invention, an apparatus of a system in which a priority terminal is shorter than a non-priority terminal in a standby time required until the terminal starts data communication after detecting that a communication medium is idle includes: a first determination unit configured to determine an amount of data transmitted from the apparatus in a case where the apparatus is operated as the priority terminal; and a control unit configured to perform control for transmitting data to other apparatus operated as the non-priority terminal according to the determined amount of data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
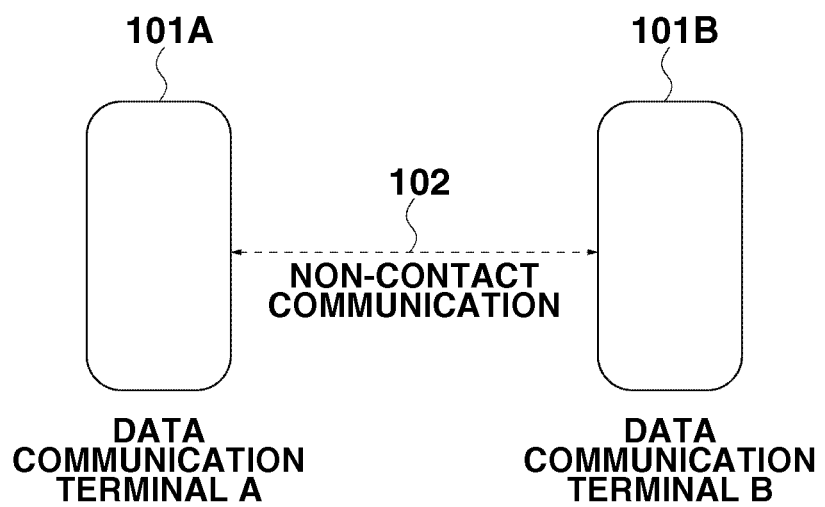
FIG. 1 is a schematic diagram of a system according to an exemplary embodiment of the present invention.

FIG. 1 is a schematic diagram of a system according to an exemplary embodiment.

Data communication terminals 101A and 101B are capable of performing data communication with each other through non-contact communication (proximity wireless communication) 102. As the non-contact communication, the near field communication (NFC) or the TransferJet (registered trademark) may be used. Hereinafter, a data communication terminal is represented by a mark 101.

Figure 10:
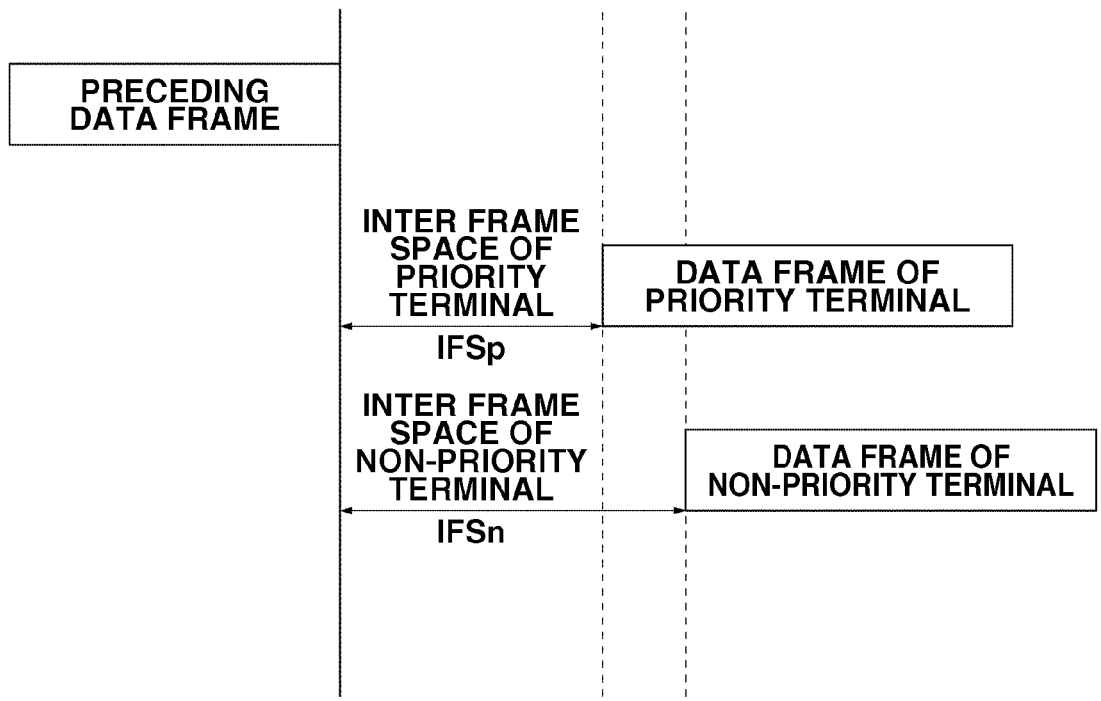
FIG. 10 is a timing chart of transmission data in a non-contact communication 102.

FIG. 10 is a timing chart of transmission data in the non-contact communication 102.

The non-contact communication 102 according to the present exemplary embodiment is configured to transmit only one directional data in the same time period. If a data communication terminal 101 transmits data, the data communication terminal 101 first performs carrier sense to detect that a communication medium is in an idle state, waits for an inter frame space (IFS), and then transmits a new data frame.

As illustrated in FIG. 10, in the non-contact communication 102, an inter frame space IFSp of a priority terminal is shorter than an inter frame space IFSn of a non-priority terminal. For this reason, if an event occurs in which the priority and the non-priority terminal transmit data at the same time, the data frame of the priority terminal is transmitted in advance, and the data frame of the non-priority terminal waits to be transmitted.

In establishing the radio link (connection), it is determined whether the data communication terminal 101 is operated as the priority or the non-priority terminal. In the non-contact communication 102, one data communication terminal 101 transmits a connection request and the other data communication terminal 101 that has received the connection request sends back a connection reply, thereby establishing the radio link (connection).

At this time, the data communication terminal 101 transmitting the connection request (and receiving the connection reply) is determined as a priority terminal. The data communication terminal 101 transmitting the connection reply (and receiving the connection request) is determined as a non-priority terminal. Thus, in the non-contact communication 102 according to the present exemplary embodiment, the data communication terminal 101 transmitting the connection request can preferentially transmit data.

For example, if only the one data communication terminal 101 has data to be transmitted and the data communication terminal 101 transmits the connection request, the data communication terminal 101 can collectively transmit the data to be transmitted.

If both the data communication terminals 101 have data to be transmitted and the data communication terminal 101 transmitting the connection request starts transmitting data, the data communication terminal 101 transmitting the connection reply cannot transmit data until the transmission of the data is finished.

As a result, the user of the data communication terminal 101 transmitting the connection reply misjudges it as a failure in communication, and can perform unnecessary operations. If the transmission of data is not started even after a predetermined time period passes, that may be processed as a time-out error depending on the application of the data communication terminal 101 transmitting the connection reply.

Figure 2:
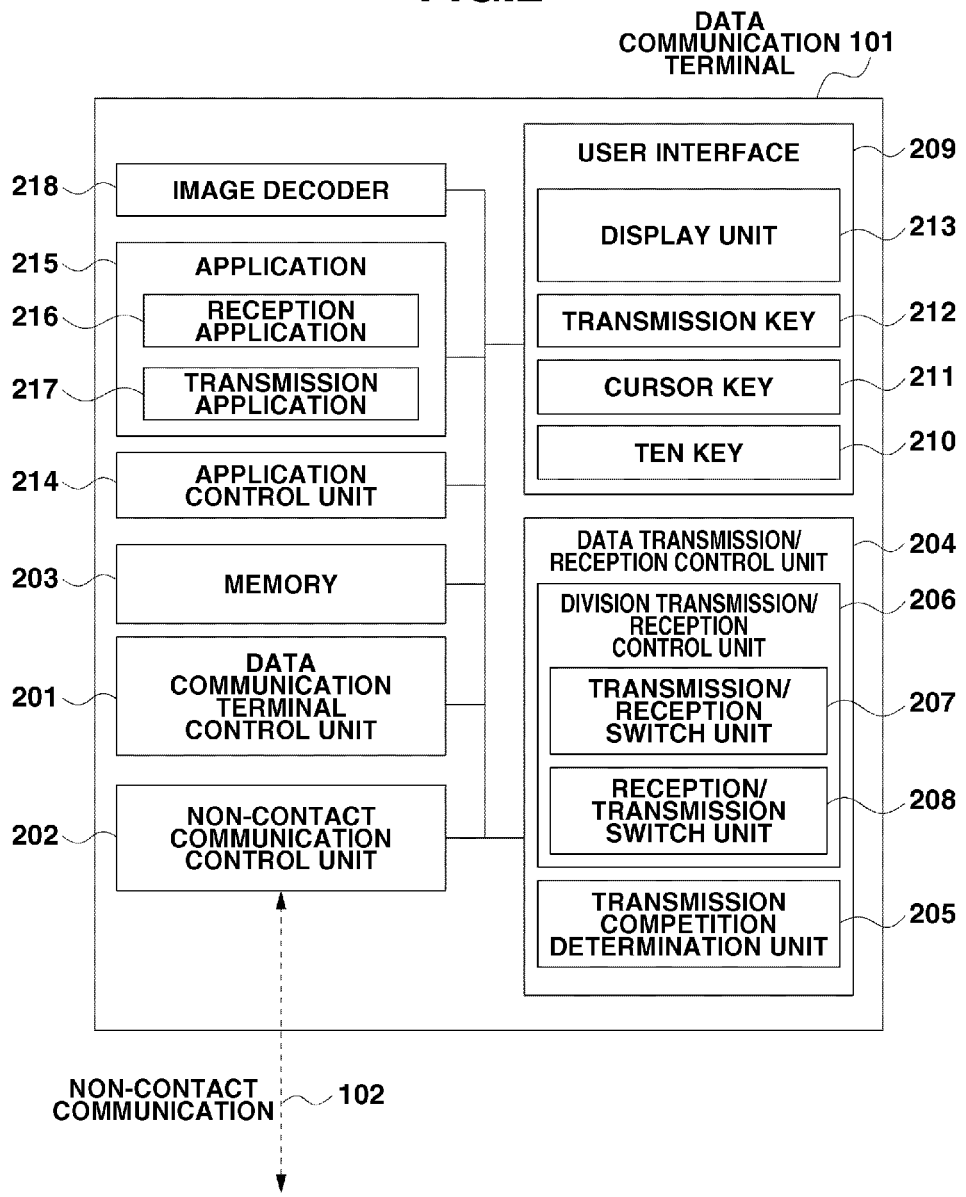
FIG. 2 is a block diagram of a data communication terminal 101.

A communication control method for solving the above issue is described below. FIG. 2 is a functional block diagram of the data communication terminal 101 according to the present exemplary embodiment. A data communication terminal control unit 201 controls the data communication terminal 101. A non-contact communication control unit 202 performs the link control of the non-contact communication 102 and the control of data transmission. A memory 203 stores data.

A data transmission/reception control unit 204 controls the transmission and reception of data via the non-contact communication 102. A transmission competition determination unit 205 determines whether competition for data transmission occurs between the data communication terminals communicating via the non-contact communication 102.

A division transmission and reception control unit 206 performs control at the time of dividing and transmitting data. The phrase "dividing and transmitting data" refers to a repetition of transmission and reception of data while switching between the transmission and reception of data. Specifically, a part of data out of files (data) to be transmitted is transmitted and then the transmission is temporarily interrupted. The transmission of data is resumed after a part of data is received from the other terminal. Such a process is repeated.

For example, if a file to be transmitted is transmitted with the file divided into a plurality of data frames and such a repetition is performed as the transmission of two data frames, the reception of two data frames, the transmission of two data frames, . . . , in this order, that is referred to as "division data transmission (or reception)."

Even if a file to be transmitted is transmitted with the file divided into a plurality of data frames and if all the divided data frames are continuously transmitted to the other terminal and data is not received from the other terminal during the transmission, that is not referred to as "division data transmission."

That case is referred to as "collective data transmission." The collective data transmission includes the following two cases: a plurality of data frames is continuously transmitted as described above; and a file to be transmitted is collectively transmitted without being divided into a plurality of data frames.

A transmission and reception switch unit 207 controls switching from transmission to reception at the time of transmitting divided data. A reception and transmission switch unit 208 controls switching from reception to transmission at the time of transmitting divided data.

A user interface 209 is included in the data communication terminal 101. A ten key 210 is used to input numerals and characters. A cursor key 211 is used to input movement on a display unit 213. A transmission key 212 is used to input the transmission of data. The display unit 213 displays data.

An application control unit 214 controls the start and stop of an application. An application 215 includes a reception application 216 and a transmission application 217. An image decoder 218 decodes an image file to display it on the display unit 213. The reception application 216 receives an image data from the other data communication terminal 101B and sequentially transmits it to the image decoder 218. The image is decoded and displayed on the display unit 213.

Figure 3:
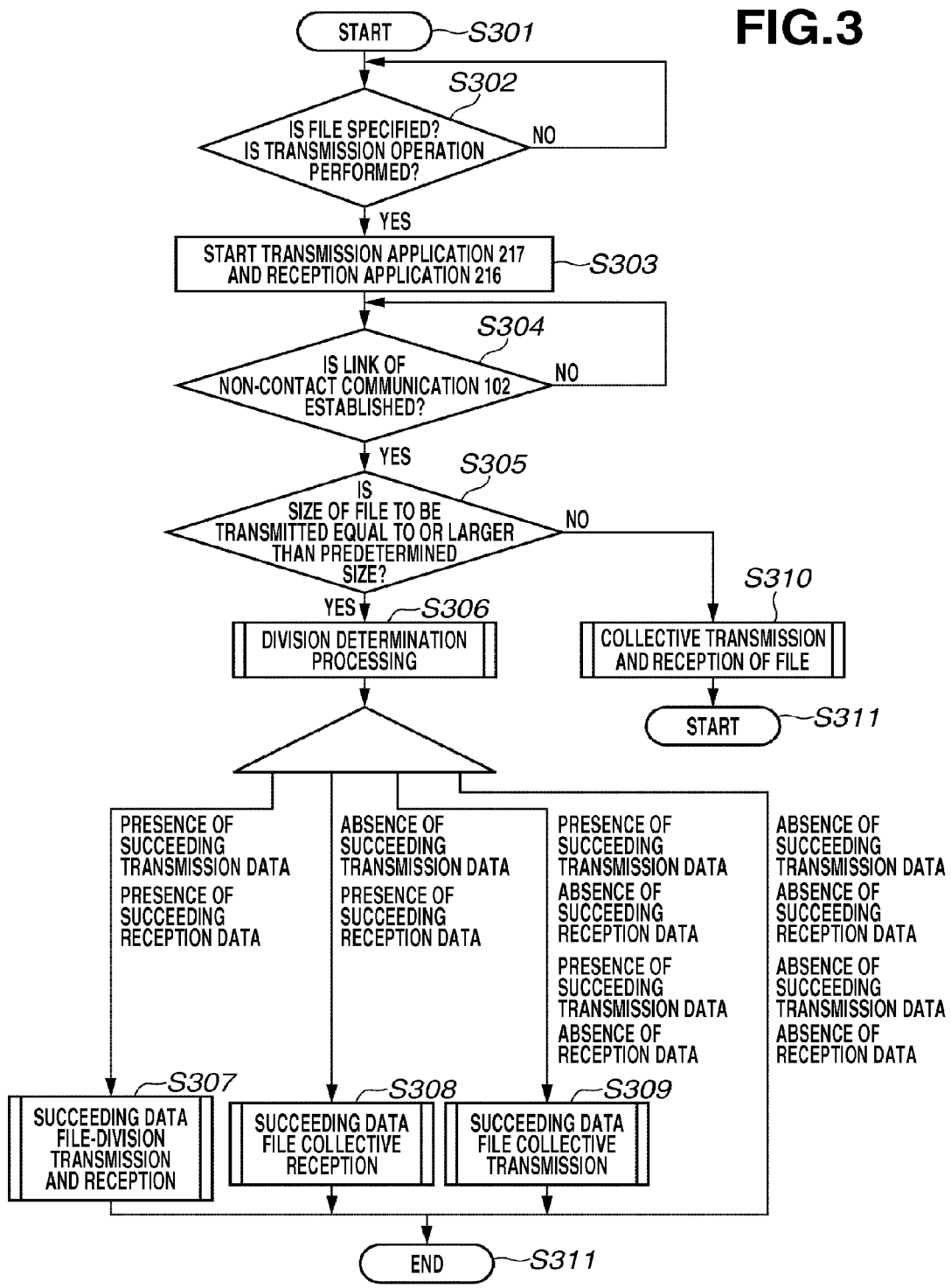
FIG. 3 is a flow chart illustrating an operation of the data communication terminal 101 according to a first exemplary embodiment.
Figure 4:
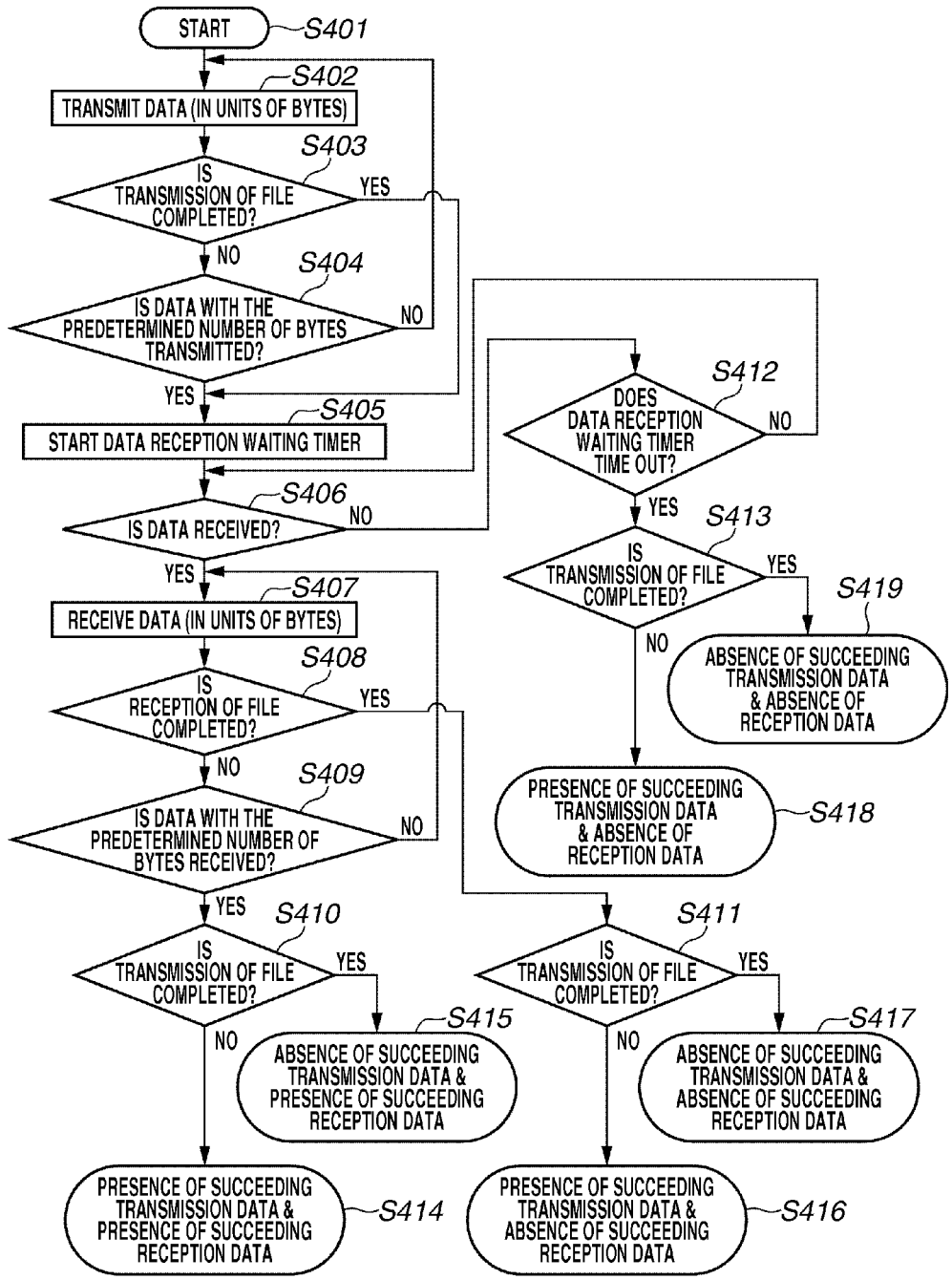
FIG. 4 is a flow chart illustrating a detailed operation of division determination processing.

FIG. 3 is a flow chart illustrating the operation of the data communication terminal 101 according to the present exemplary embodiment. FIG. 4 is a flow chart illustrating a detailed operation of "division determination processing in step S306" in FIG. 3. The division determination processing S306 is performed in the transmission competition determination unit 205.

Figure 5:
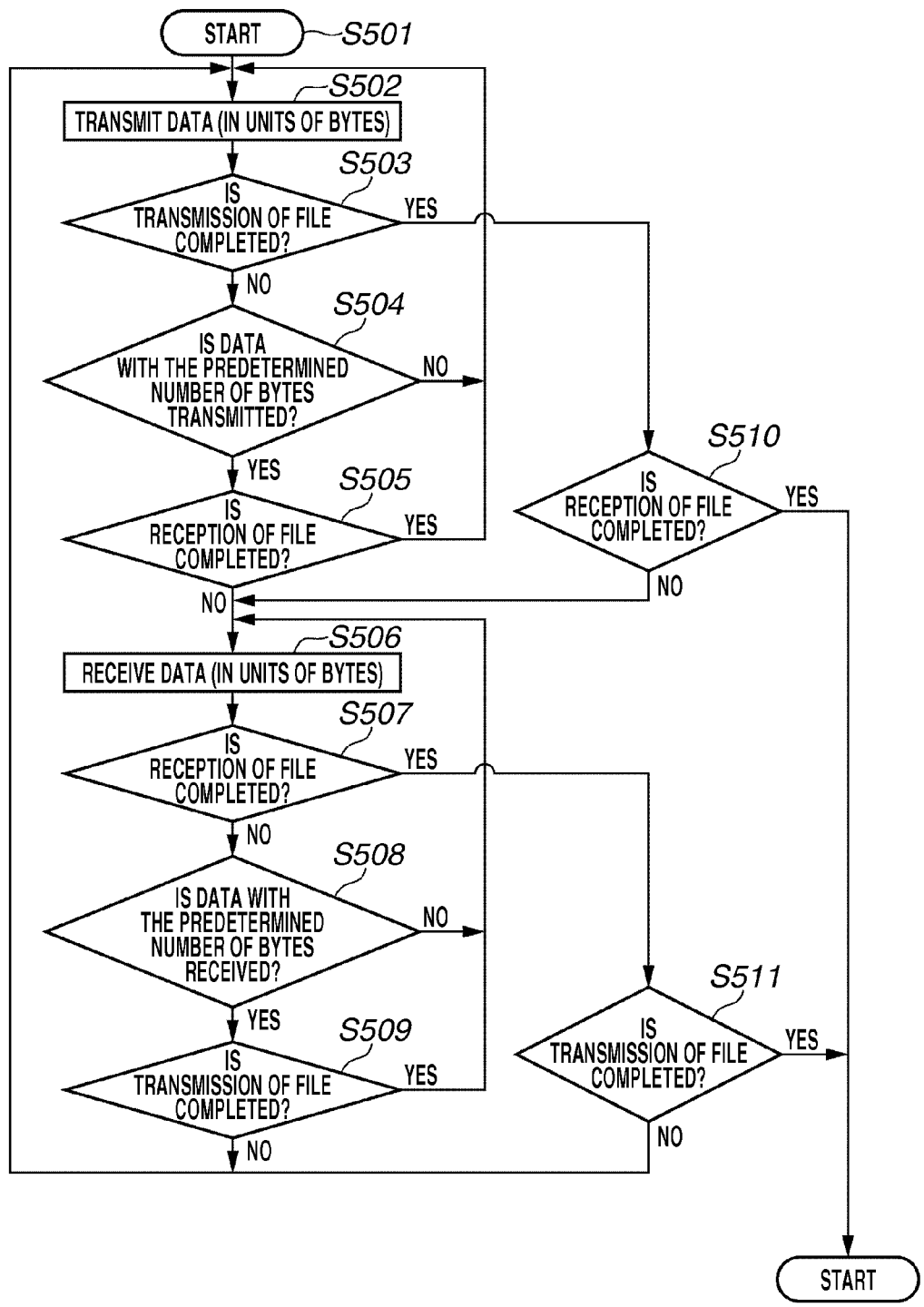
FIG. 5 is a flow chart illustrating a detailed operation of file division transmission and reception.

FIG. 5 is a flow chart illustrating a detailed operation of "succeeding data file division transmission and reception in step S307" in FIG. 3. The succeeding data file division transmission and reception S307 is carried out in the division transmission and reception control unit 206.

The following operation is conducted when the user of the data communication terminal 101 with the function of the non-contact communication 102 transmits a file to the other data communication terminal. The user specifies a file by operating the ten key 210 or the cursor key 211, presses the transmission key 212, and brings the data communication terminal 101 close to the other data communication terminal so that antenna units of the non-contact communication 102 are made close to each other.

In step S301, the processing illustrated in FIG. 3 is started. In step S302, if a file is specified and a transmission operation is performed, in step S303, the application control unit 214 of the data communication terminal 101 starts the transmission application 217 and the reception application 216.

The user brings the data communication terminal 101 close to the other data communication terminal to transmit and receive a message of the connection request and the connection reply therebetween, establishing the link of the non-contact communication 102, which enables data to be transmitted and received. As described above, a priority or a non-priority terminal is determined depending on which is transmitted, the connection request or the connection reply. In the following description, the data communication terminal 101 transmits the connection request, and therefore is supposed to operate as the priority terminal.

In step S304, if the link of the non-contact communication 102 is established (YES in step S304), in step S305, the data communication terminal 101 that is determined as the priority terminal determines whether the size of a file (the amount of data) to be transmitted is equal to or larger than a predetermined size. If the size is equal to or larger than the predetermined size (YES in step S305), the data communication terminal 101 performs "the division transmission determination processing in step S306."

If the size of the file to be transmitted is smaller than the predetermined size (NO in step S305), in step S310, the data communication terminal 101 performs not "the division transmission determination processing in step S306" but the collective transmission of the file.

If the other data communication terminal has also a file to be transmitted, the data communication terminal finishes transmitting a file, and then receives the file transmitted from the other data communication terminal using the reception application, which is being started. In other words, if the size of the file to be transmitted is smaller than the predetermined size, a time interval until the completion of transmission is short, so that even if the other data communication terminal has a file to be transmitted, the transmission of data can be immediately started, allowing preventing a time-out error from occurring.

If the file is collectively transmitted in the case where the size of the file to be transmitted is equal to or larger than the predetermined size, a time-out error may occur if the other data communication terminal has a file to be transmitted. Therefore, the following division determination processing is performed in the case where the size of the file to be transmitted is equal to or larger than the predetermined size.

"The division determination processing performed in step S306" is described in detail with reference to the flow chart illustrated in FIG. 4. "The division determination processing in step S306" is performed in the transmission competition determination unit 205.

In step S401, the processing is started in FIG. 4. In steps S402, S403, and S404, the data communication terminal 101 transmits data with the predetermined number of transmission bytes for division determination. If the transmission of a file is completed before the number of bytes of the file to be transmitted reaches the predetermined number of transmission bytes for division determination (YES in step S403), the data communication terminal 101 determines that succeeding transmission data does not exist, and completes the transmission of data. The processing proceeds to step S405.

Other than that, in other words, if the data communication terminal 101 determines that the transmission of the file is not completed in step S403 (NO in step S403) and transmits data with the predetermined number of transmission bytes for division determination (YES in step S404), the data communication terminal 101 determines that succeeding transmission data exists, and interrupts the transmission of data and starts receiving data. In other words, the data communication terminal 101 operating as a priority terminal temporarily interrupts the transmission of data, and grants data transmission right to the other data communication terminal, though the terminal 101 has data still to be transmitted and can preferentially transmit the data.

In step S405, the data communication terminal 101 starts a data reception waiting timer to receive data. The data reception waiting timer is set to a time longer than the inter frame space IFSn of the non-priority terminal.

If reception data is not detected (NO in step S406) before the data reception waiting timer times out (YES in step S412), the data communication terminal 101 determines that reception data does not exist, and finishes receiving data. In this case, if the transmission of the file is completed as a result of the determination in step S403 (YES in step S413), in step S419, the data communication terminal 101 determines that neither succeeding transmission data nor reception data exists, and finishes the processing in FIG. 4.

If the data communication terminal 101 determines that the transmission of the file is not completed (NO in step S413), in step S418, the data communication terminal 101 determines that succeeding transmission data exists but reception data does not exist, and finishes the processing in FIG. 4.

If reception data is detected before the data reception waiting timer times out (YES in step S406), in steps S407, S408, and S409, the data communication terminal 101 receives data with the predetermined number of reception bytes for division determination. The number of transmission bytes for division determination is equal to the number of reception bytes for division determination.

If the reception of a file is completed before the number of reception bytes reaches the predetermined number of reception bytes for division determination (YES in step S408), the data communication terminal 101 determines that succeeding reception data does not exist, and finishes receiving data. The processing proceeds to step S411. In this case, if the transmission of the file is completed as a result of the determination in step S403 (YES in step S411), in step S417, the data communication terminal 101 determines that neither succeeding transmission data nor succeeding reception data exists, and finishes the processing in FIG. 4.

If the data communication terminal 101 determines that the transmission of the file is not completed in step S403 (NO in step S411), in step S416, the data communication terminal 101 determines that succeeding transmission data exists but succeeding reception data does not exist, and finishes the processing in FIG. 4.

If the data communication terminal 101 determines that the reception of a file is not completed in step S408 and receives data with the number of reception bytes for division determination (YES in step S409), the data communication terminal 101 determines that succeeding reception data exists. In this case, if the transmission of the file is completed as a result of the determination in step S403 (YES in step S410), in step S415, the data communication terminal 101 determines that succeeding transmission data does not exist but succeeding reception data exists, and finishes the processing in FIG. 4.

If the data communication terminal 101 determines that the transmission of the file is not completed in step S403 (YES in step S410), in step S414, the data communication terminal 101 determines that succeeding transmission data exists but succeeding reception data does not exist, and finishes the processing in FIG. 4.

Thus, as far as transmission data is concerned, the division determination processing in step S306 determines whether succeeding transmission data exists or not depending on whether data to be transmitted exists or not after the division determination processing in step S306. On the other hand, as far as reception data is concerned, the division determination processing in step S306 determines that reception data does not exist if the other data communication terminal does not have data to be transmitted.

If the other data communication terminal has data to be transmitted, the division determination processing in step S306 determines that succeeding reception data exists and succeeding transmission data does not exist depending on whether data to be transmitted exists or not after the division determination processing performed in step S306.

Therefore, the division determination processing in step S306 performs the following kinds of determination:
Presence of succeeding transmission data & Presence of succeeding reception data;
Presence of succeeding transmission data & Absence of succeeding reception data;
Absence of succeeding transmission data & Presence of succeeding reception data;
Absence of succeeding transmission data & Absence of succeeding reception data;
Presence of succeeding transmission data & Absence of reception data; and
Absence of succeeding transmission data & Absence of reception data.

In the case of the presence of succeeding transmission data and the presence of succeeding reception data, the data communication terminal 101 performs "succeeding data file-division transmission and reception in step S307" illustrated in FIG. 3. "The succeeding data file-division transmission and reception in step S307" is described in detail below.

In the case of the absence of succeeding transmission data and the presence of succeeding reception data, the data communication terminal 101 performs "succeeding data file collective reception in step S308" illustrated in FIG. 3. In the succeeding data file collective reception in step S308, data is never transmitted any more and continuously received from the other data communication terminal until a file is ended.

In the case of "the presence of succeeding transmission data and the absence of succeeding reception data" and "the presence of succeeding transmission data and absence of reception data", the data communication terminal 101 performs "succeeding data file collective transmission in step S309" illustrated in FIG. 3. In the succeeding data file collective transmission in S309, data is never received any more and continuously transmitted until a file is ended. In other words, the transmission of data is not interrupted.

In the case of "the absence of succeeding transmission data and the absence of succeeding reception data" and "the absence of succeeding transmission data and the absence of reception data", in step S311, the data communication terminal 101 ends the data transmission/reception processing.

The succeeding data file-division transmission and reception in step S307 is described in detail with reference to the flow chart in FIG. 5. The succeeding data file-division transmission and reception in S307 is performed by the division transmission and reception control unit 206. Switching between the transmission and the reception of data is repeated until a file is ended.

If the reception of a file transmitted from the other data communication terminal is completed in the middle of the processing of the file division transmission and reception in step S307, a division data reception processing is not performed any more, and data is continuously transmitted until a file is ended. In other words, the transmission of data is not interrupted after the reception of the file from the other data communication terminal is completed.

If the transmission of a file is completed in the middle of the processing of the file division transmission and reception in step S307, a division data transmission processing is not performed any more, and data is continuously received until a file is ended.

In step S501, the processing is started in FIG. 5. In the division data transmission, in steps S502, S503, and S504, the data communication terminal 101 transmits data with the predetermined number of transmission bytes for division transmission. The number of transmission bytes for division transmission may be different from or equal to the abovementioned number of transmission bytes for division determination.

If the transmission of a file is finished before the number of bytes of the file to be transmitted reaches that of transmission bytes for division transmission (YES in step S503) and if the reception of a file from the other data communication terminal is not completed (NO in step S510), the processing proceeds to step S506 to perform the division data reception. If the reception of a file from the other data communication terminal is completed (YES in step S510), in step S512, a transmission and reception processing is finished.

If the transmission of data with the predetermined number of transmission bytes for division transmission is completed (YES in step S504) and if the reception of a file from the other data communication terminal is not completed (NO in step S505), the proceeding proceeds to step S506 to perform the division data reception. More specifically, the data communication terminal 101 operating as a priority terminal temporarily interrupts the transmission of data and grants data transmission right to the other data communication terminal, though the terminal 101 has data still to be transmitted and can preferentially transmit the data.

If the reception of a file from the other data communication terminal is completed (YES in step S505), the processing returns to step S502 to continue transmitting data. In step S505, if once it is determined that the reception of a file is completed, thereafter the determination in step S505 does not need to be performed. In that case, the remaining transmission file may be transmitted with the file divided into the number of bytes different from the number of transmission bytes for division transmission, or may be collectively transmitted without being divided.

In the division data reception, in steps S506, S507, and S508, the data communication terminal 101 receives data with the predetermined number of reception bytes for division reception. The number of reception bytes for division reception is made equal to the number of transmission bytes for division transmission.

If the reception of a file is finished before the number of bytes of the file to be received reaches that of reception bytes for division reception (YES in step S507) and if the transmission of a file is not completed (NO in step S511), the processing returns to step S502 to transmit data. In this case, the remaining transmission file may be collectively transmitted. If the transmission of the file is completed (YES in step S511), in step S512, the transmission and reception processing is finished.

If the reception of data with the predetermined number of reception bytes for division reception is completed (YES in step S508) and if the transmission of a file to the other data communication terminal is not completed (NO in step S509), the processing returns to step S502 to perform again the division data transmission processing in steps S502, S503, and S504. If the transmission of the file to the other data communication terminal is completed (YES in step S509), the processing returns to step S506 to continue receiving data. The data is received until the reception of the file from the other data communication terminal is completed.

Figure 6:
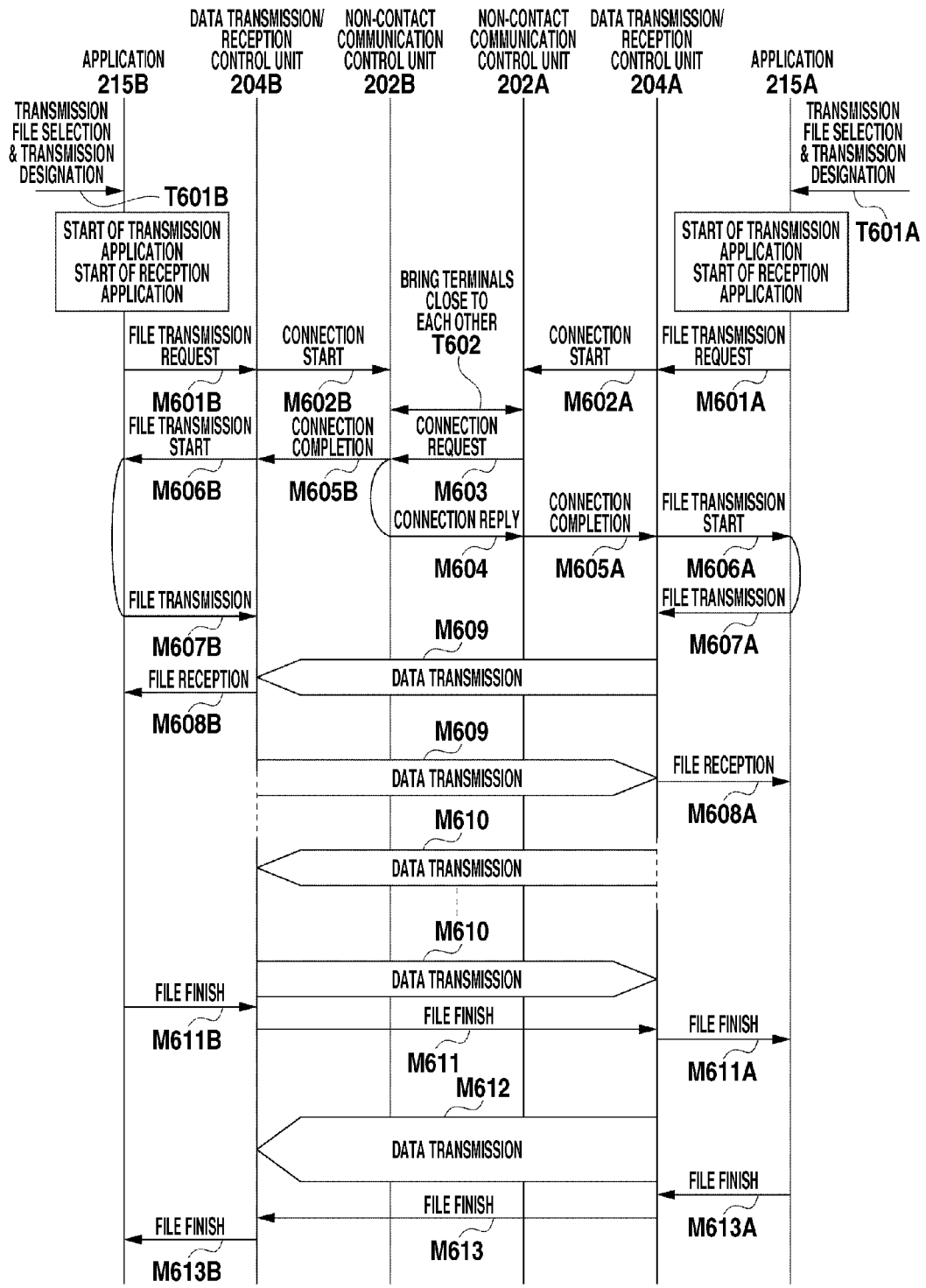
FIG. 6 is a message sequence chart between the data communication terminals 101 according to the first exemplary embodiment.
Figure 7:
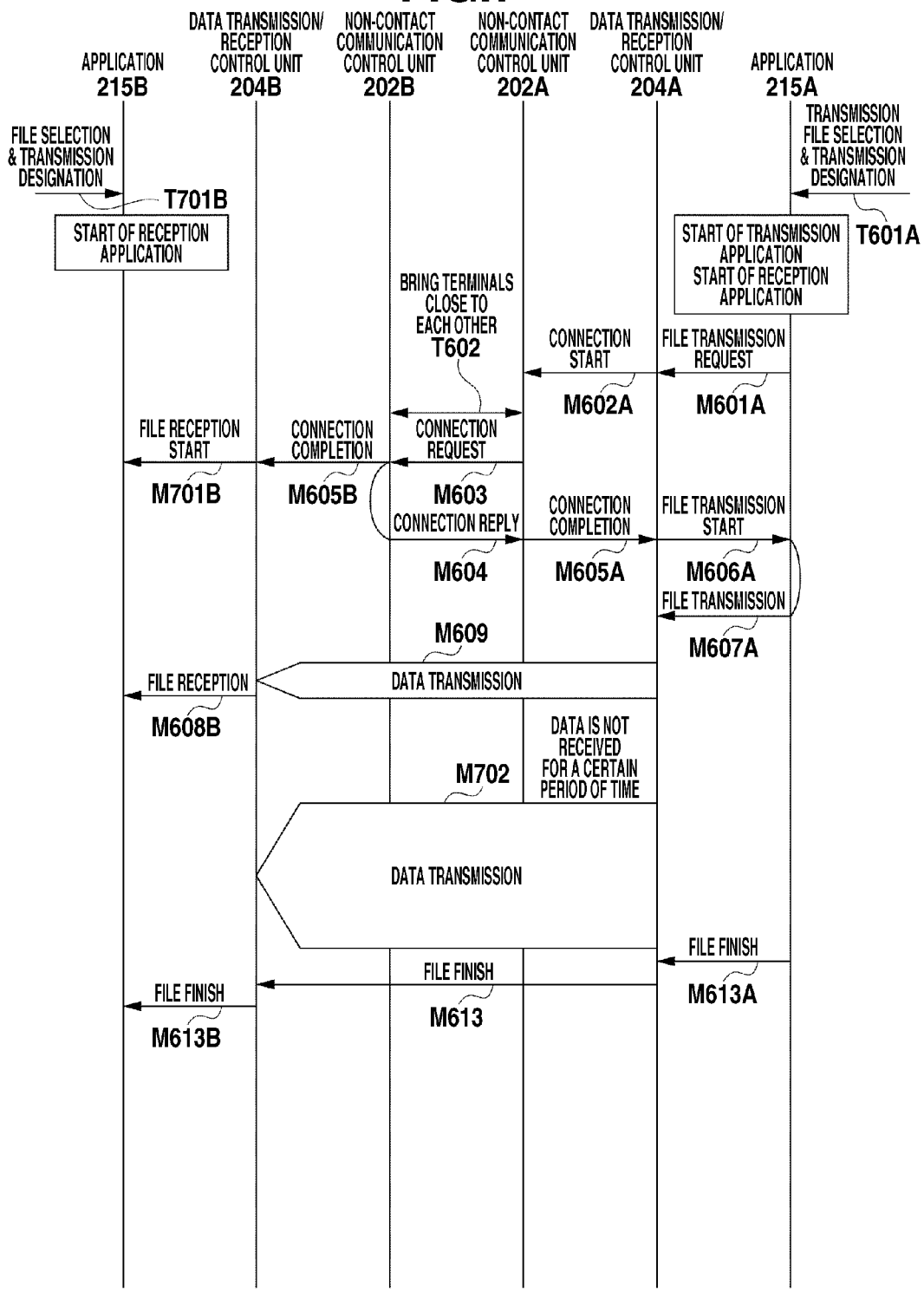
FIG. 7 is a message sequence chart between the data communication terminals 101 according to the first exemplary embodiment.

FIGS. 6 and 7 are message sequence charts between the data communication terminals 101A and 101B according to a first exemplary embodiment. FIG. 6 is a message sequence chart in the case where an operation for transmitting data is performed by both of the data communication terminals 101A and 101B, and it is determined that "both succeeding transmission data and succeeding reception data exist" in "the division determination processing in step S306."

A file is specified and transmitted by the data communication terminal 101A (T601A) to start a transmission and a reception application. When the transmission and the reception application are started, an application 215A notifies a data transmission/reception control unit 204A of a file transmission request (M601A), and then the data transmission/reception control unit 204A notifies a non-contact communication control unit 202A of a connection start message (M602A).

Similarly, a file is specified and transmitted by the data communication terminal 101B (T601B) to start a transmission and a reception application. An application 215B notifies a data transmission/reception control unit 204B of a file transmission request (M601B), and then the data transmission/reception control unit 204B notifies a non-contact communication control unit 202B of a connection start message (M602B).

The user brings the data communication terminal 101A close to the data communication terminal 101B (T601B) to transmit and receive messages of a connection request (M603) and a connection reply (M604), establishing a link of the non-contact communication 102, which enables data to be transmitted and received. When the non-contact communication control units 202A and 202B in the data communication terminals 101A and 101B receive the connection start message sent from the data transmission/reception control units 204A and 204B, the non-contact communication control units 202A and 202B transmit a connection request (M603) on a first-come-first-served basis.

In the following description in FIG. 6, the non-contact communication control unit 202A of the data communication terminal 101A transmits the connection request (M603) previous to the non-contact communication control unit 202B, and the non-contact communication control unit 202B in the data communication terminal 101B sends back the connection reply (M604). As a result, the data communication terminal 101A acts as a priority terminal, and preferentially acquires data transmission rights, and the data communication terminal 101B acts as a non-priority terminal.

The non-contact communication control unit 202B of the data communication terminal 101B that has received the connection request (M603) notifies the data transmission/reception control unit 204B of a connection completion message (M605B). The data transmission/reception control unit 204B that has received the connection completion message (M605B) notifies the application 215B of a file transmission start instruction message (M606B).

The application 215B that has received the instruction message instructs the data transmission/reception control unit 204B to transmit a file (M607B) using the transmission application being started. At the time of notification of the file transmission start instruction message (M606B) and file transmission instructions (M607B), a message indicating that the transmission of a file is started may be displayed on the display unit 213 to notify the user.

Similarly, the non-contact communication control unit 202A of the data communication terminal 101A that has received the connection reply (M604) notifies the data transmission/reception control unit 204A of a connection completion message (M605A). The data transmission/reception control unit 204A that has received the connection completion message (M605A) notifies the application 215A of a file transmission start instruction message (M606A).

The application 215A that has received the instruction message instructs the data transmission/reception control unit 204A to transmit a file (M607A) using the transmission application that is operating. At the time of notification of the file transmission start instruction message (M606A) or file transmission instructions (M607A), a message indicating that the transmission of a file is started may be displayed on the display unit 213 to notify the user.

The data transmission/reception control unit 204A of the data communication terminal 101A transmits data with the number of transmission bytes for division determination out of a file to be transmitted, and then receives data with the number of reception bytes for division determination (M609) transmitted from the data communication terminal 101B.

The data transmission/reception control units 204A and 204B of the data communication terminals 101A and 101B that have received the data transmit a file reception notification (M608A and M608B) to the applications 215A and 215B. A message indicating that the file is being received may be displayed on the display unit 213 when the applications 215A and 215B receive the file reception notification (M608A and M608B).

The data communication terminal 101A, which has determined that "both succeeding transmission data and succeeding reception data exist" by transmitting data with the number of transmission bytes for division determination and receiving data with the number of reception bytes for division determination, transmits the remaining data of the transmission file, and receives the remaining data of the reception file. Specifically, the transmission of data with the number of transmission bytes for division determination and the reception of data with the number of reception bytes for division determination are alternately repeated (M610).

When the data communication terminal 101B finishes the transmission of the file to be transmitted, the application 215B transmits a file finish notification (M611B) to the data transmission/reception control unit 204B. The data transmission/reception control unit 204B transmits a file finish notification (M611) to the data transmission/reception control unit 204A. The data transmission/reception control unit 204A transmits a file finish notification (M611A) to the application 215A.

The data communication terminal 101B may display a message indicating that the transmission of the file is completed on the display unit 213 when finishing the transmission of the file to be transmitted.

The data communication terminal 101A receives the file finish notification (M611A) to recognize that the reception of the file is completed. At this moment, the data communication terminal 101A may display a message indicating that the reception of the file is completed on the display unit 213.

When the data communication terminal 101A determines that the reception of the file is completed, the data communication terminal 101A transmits the remaining data of the file to be transmitted (M612). When the transmission of all data is completed, the data communication terminal 101A transmits a file finish notification to the data communication terminal 101B (M613A, M613, and M613B). The data communication terminal 101A may display a message indicating that the transmission of the file is completed on the display unit 213 when finishing the transmission of the file to be transmitted.

The data communication terminal 101B may display a message indicating that the reception of the file is completed on the display unit 213 when receiving the file finish notification (M613B). Thus, data communication is completed between the data communication terminals 101A and 101B.

FIG. 7 is a message sequence chart in the case where an operation for transmitting a file is performed by the data communication terminals 101A, and an operation for receiving a file is performed by the data communication terminals 101B. In this case, it is determined that "reception data does not exist, but succeeding transmission data exists" in "the division determination processing performed in step S306." The processes similar to those in FIG. 6 are denoted by the same reference numerals and characters.

A file is specified and transmitted by the data communication terminal 101A (T601A), and then the transmission and the reception applications are started. When the transmission and the reception applications are started, the application 215A notifies the data transmission/reception control unit 204A of the file transmission request (M601A) and then the data transmission/reception control unit 204A notifies the non-contact communication control unit 202A of the connection start message (M602A).

The file is received by the data communication terminal 101B (T701B), then only the reception application is started. In the following description, only the reception application is started, however, the transmission application may be started.

The user brings the data communication terminal 101A close to the data communication terminal 101B (T602) to transmit and receive messages of a connection request (M603) and a connection reply (M604), establishing a link of the non-contact communication 102, which enables data to be transmitted and received.

In FIG. 7, the non-contact communication control unit 202B of the data communication terminal 101B is not notified of the connection start message, so that only the non-contact communication control unit 202A of the data communication terminal 101A attempts to transmit the connection request. As a result, as is the case with FIG. 6, the non-contact communication control unit 202A of the data communication terminal 101A transmits the connection request (M603), and the non-contact communication control unit 202B of the data communication terminal 101B sends back the connection reply (M604).

The non-contact communication control unit 202B of the data communication terminal 101B that has received the connection request (M603) notifies the data transmission/reception control unit 204B of the connection completion message (M605B). The data transmission/reception control unit 204B that has received the connection completion message (M605B) notifies the application 215B of a file reception start instruction message (M701B).

The application 215B that has received the instruction message waits for the reception of data from the data communication terminal 101A using the transmission application that is operating. At the time of notification of the file transmission start instruction message (M701B), a message indicating that the transmission of a file is started may be displayed on the display unit 213.

The non-contact communication control unit 202A of the data communication terminal 101A that has received the connection reply (M604) notifies the data transmission/reception control unit 204A of the connection completion message (M605A). The data transmission/reception control unit 204A that has received the connection completion message (M605A) notifies the application 215A of the file transmission start instruction message (M606A).

The application 215A that has received the instruction message instructs the data transmission/reception control unit 204A to transmit a file (M607A) using the transmission application that is operating. At the time of notification of the file transmission start instruction message (M606B) and file transmission instructions (M607B), a message indicating that the transmission of a file is started may be displayed on the display unit 213.

The data transmission/reception control unit 204A of the data communication terminal 101A transmits data with the number of transmission bytes for division determination (M609), and waits for the reception of data with the number of reception bytes for division determination from the data communication terminal 101B for a predetermined time period timed by the data reception waiting timer.

Since the data is not transmitted from the data communication terminal 101B, the data reception waiting timer times out. As a result, the data communication terminal 101A determines that "succeeding transmission data exists, but reception data does not exist" and performs "succeeding data file collective transmission" (M702). In M702, the file may be transmitted with the file divided into the predetermined number of bytes or may be collectively transmitted without being divided.

When the data communication terminal 101A completes the transmission of the file, the data communication terminal 101A transmits the file finish notification to the data communication terminal 101B (M613A, M613, and M613B). The data communication terminal 101A may display a message indicating that the transmission of the file is completed on the display unit 213 when completing the transmission of the file.

The data communication terminal 101B may display a message indicating that the reception of the file is completed on the display unit 213 when receiving the file finish notification (M613B). Thus, data communication is completed between the data communication terminals 101A and 101B.

Thus, in the first exemplary embodiment, the data communication terminal acting as a priority terminal determines whether the amount of data of a file to be transmitted is equal to or larger than a predetermined value. If the amount of data is equal to or larger than the predetermined value, a predetermined amount of data of the file to be transmitted is transmitted, and then the transmission of the data is temporarily stopped, and confirms whether there is data to be transmitted from the other data communication terminal.

If there is data to be transmitted from the other data communication terminal, a role of transmission and reception is switched so that data is alternately transmitted between both of the data communication terminals. In other words, even if data can be preferentially transmitted, a file is not collectively transmitted and data communication is interrupted during the course of the transmission, which data transmission right is granted to the other data communication terminal.

This allows the other data communication terminal, which is a non-priority terminal, to start the transmission of data, preventing the user from performing an unnecessary operation while communication is in good order. Furthermore, it is possible to complete the transmission of data without an error, even if such an application that a time-out error is produced unless the transmission of data is started even though the predetermined time period passes is used.

Depending on an application, a time-out error may occur unless the following data is transmitted within the predetermined time period even though the transmission of data is started, however, data is alternately transmitted and received, so that the above unnecessary operation can be prevented in the present exemplary embodiment.

According to the present exemplary embodiment, even in the communication system in which only any one of transmission and reception can be performed at the same time, a file can be received while a file is being transmitted without changing the communication system. As a result, even if the transmission of data is started nearly at the same time in both the terminals, the user can realize that data is normally transmitted or received from the start of communication.

Although the above description is made on the assumption that the transmission of data with the number of transmission bytes for division determination is performed in steps S402 to S404 in FIG. 4, and then switched to the reception of data with the number of reception bytes for division determination, the transmission of data with the number of transmission bytes for division determination may be omitted. This is because the data communication terminal determined as the priority terminal can determine whether there is data transmitted from the other data communication terminal only by receiving data with the number of reception bytes for division determination.

Although the above description is made on the assumption that data is transmitted first and then received in FIG. 5, data may be received first and then transmitted.

In the above description, when a file is specified and a transmission operation is performed, both of the transmission and the reception application are started, however, the reception application does not need to be started. In this case, the reception application may be started if reception data is detected (YES in step S406) before the data reception waiting timer times out in "the division determination processing in step S306."

However, if the reception application is started if reception data is detected (YES in step S406), the reception data need to be buffered until the starting of the reception application is completed so that the reception application surely processes an initial reception data. This operation is performed to start the reception application only if data is received, which prevents an unneeded application from being started to reduce a processing load.

In the first exemplary embodiment, first a predetermined amount of data is transmitted and received to confirm whether there is data transmitted from the other data communication terminal, thereby determining whether a file is transmitted and received with the file divided. In a second exemplary embodiment, an example is described below in which a file transmission request is first transmitted and received between data communication terminals to determine whether a file is transmitted and received with the file divided.

A system configuration and a functional block diagram of the data communication terminal 101 according to the second exemplary embodiment are similar to those described in FIGS. 1 and 2, so that the description thereof is omitted.

Figure 8:
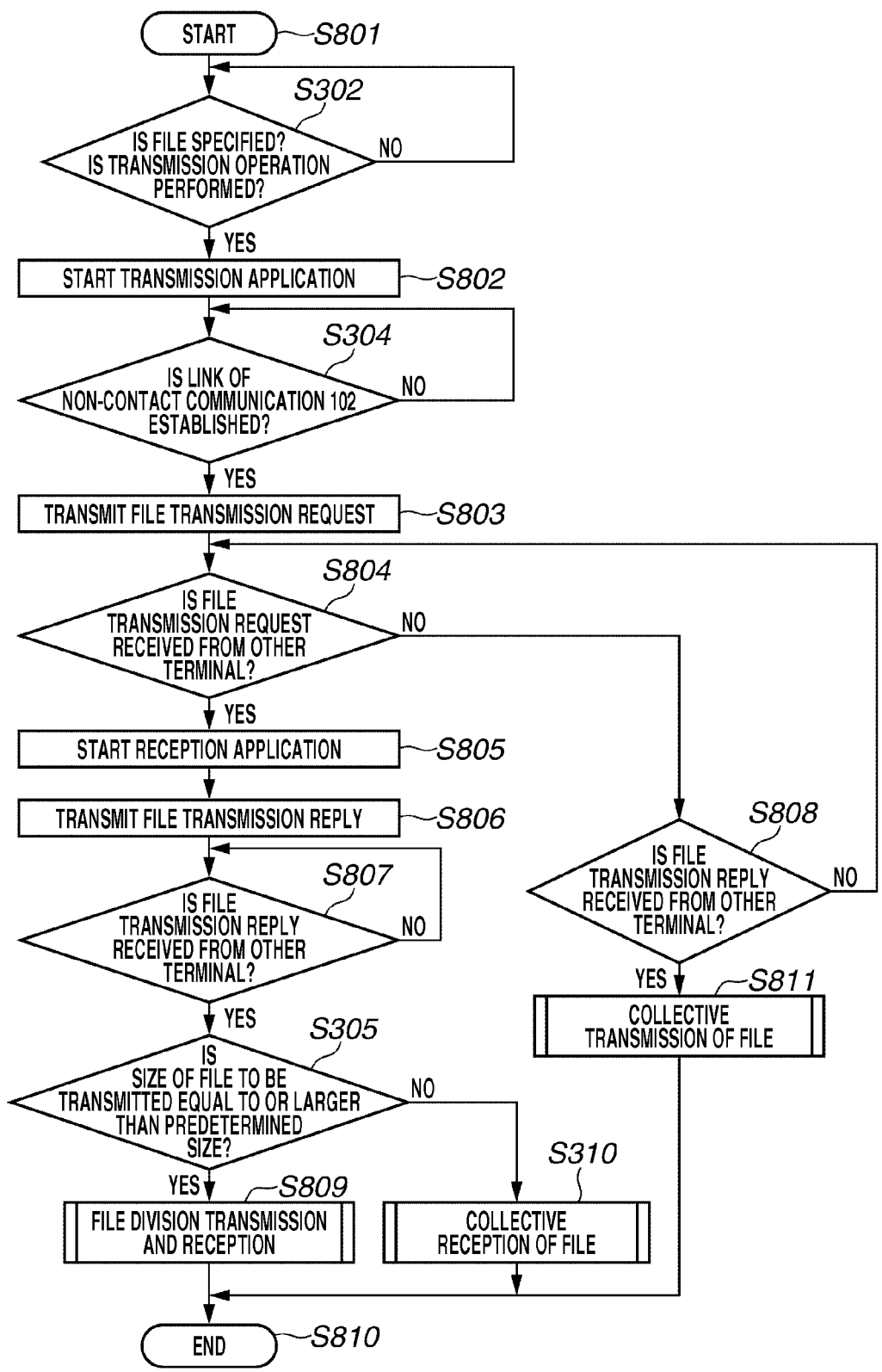
FIG. 8 is a flow chart illustrating an operation of the data communication terminals 101 according to a second exemplary embodiment.

FIG. 8 is a flow chart illustrating the operation of the data communication terminal 101 according to the second exemplary embodiment. The processes similar to those in FIG. 3 are denoted by the same reference numerals and characters.

A method of starting the transmission of a file is similar to that described in the first exemplary embodiment. In step S801, the processing in FIG. 8 is started. If a file is specified and a transmission operation is performed (YES in step S302), in step S802, the application control unit 214 of the data communication terminal 101 starts the transmission application. In this description, only the transmission application is started, however, as is the case with the first exemplary embodiment, the reception application also may be started.

The user brings the data communication terminal 101 close to the other data communication terminal to transmit and receive a message of the connection request and the connection reply therebetween, establishing the link of the non-contact communication 102, which enables data to be transmitted and received. As described above, either a priority or a non-priority terminal is determined depending on which is transmitted, the connection request or the connection reply. In the following description, the data communication terminal 101 transmits the connection request and therefore is supposed to operate as the priority terminal.

If the link of the non-contact communication 102 is established (YES in step S304), in step S803, the data communication terminal 101 that is determined as the priority terminal transmits a file transmission request to the other data communication terminal. The file transmission request refers to a message indicating that there is a file to be transmitted to the other data communication terminal.

In steps S804 and S808, the data communication terminal 101 waits for the file transmission request or a file transmission reply transmitted from the other data communication terminal for a predetermined time period. If the data communication terminal 101 does not receive the file transmission request from the other data communication terminal (No in step S804) but receives the file transmission reply therefrom (YES in step S808), in step S811, the data communication terminal 101 collectively transmits a file.

This means that, if the data communication terminal 101 does not receive the file transmission request, the other data communication terminal does not transmit data, so that the data communication terminal 101 continuously transmits data until the file is finished without interrupting the transmission of data.

If the data communication terminal 101 receives the file transmission request from the other data communication terminal before receiving the file transmission reply therefrom (YES in step S804), in step S805, the data communication terminal 101 starts the reception application. In step S806, the data communication terminal 101 transmits the file transmission reply to the other data communication terminal. After the data communication terminal 101 transmits the file transmission reply, in step S807, the data communication terminal 101 waits for the file transmission reply from the other data communication terminal.

If the data communication terminal 101 receives the file transmission reply from the other data communication terminal (YES in step S807), in step S305, the data communication terminal 101 determines whether the size of a file to be transmitted is equal to or larger than a predetermined size. If the size is equal to or larger than the predetermined size (YES in step S305), the data communication terminal 101 performs "file division transmission and reception in step S809."

"File division transmission and reception in step S809" is similar to "succeeding data file division transmission and reception in step S307" according to the first exemplary embodiment. The flow chart thereof is illustrated in FIG. 5.

If the size of the file to be transmitted is not larger than the predetermined size (NO in step S305), in step S310, the data communication terminal 101 performs "file collective transmission and reception." In this case, the data communication terminal 101 transmits all the file to be transmitted using the transmission application, and then continues the reception of data until the file from the other data communication terminal 101 is finished.

When data communication is completed by any of methods performed in steps S809, S310, and S811, in step S810, the processing of FIG. 8 is ended.

Figure 9:
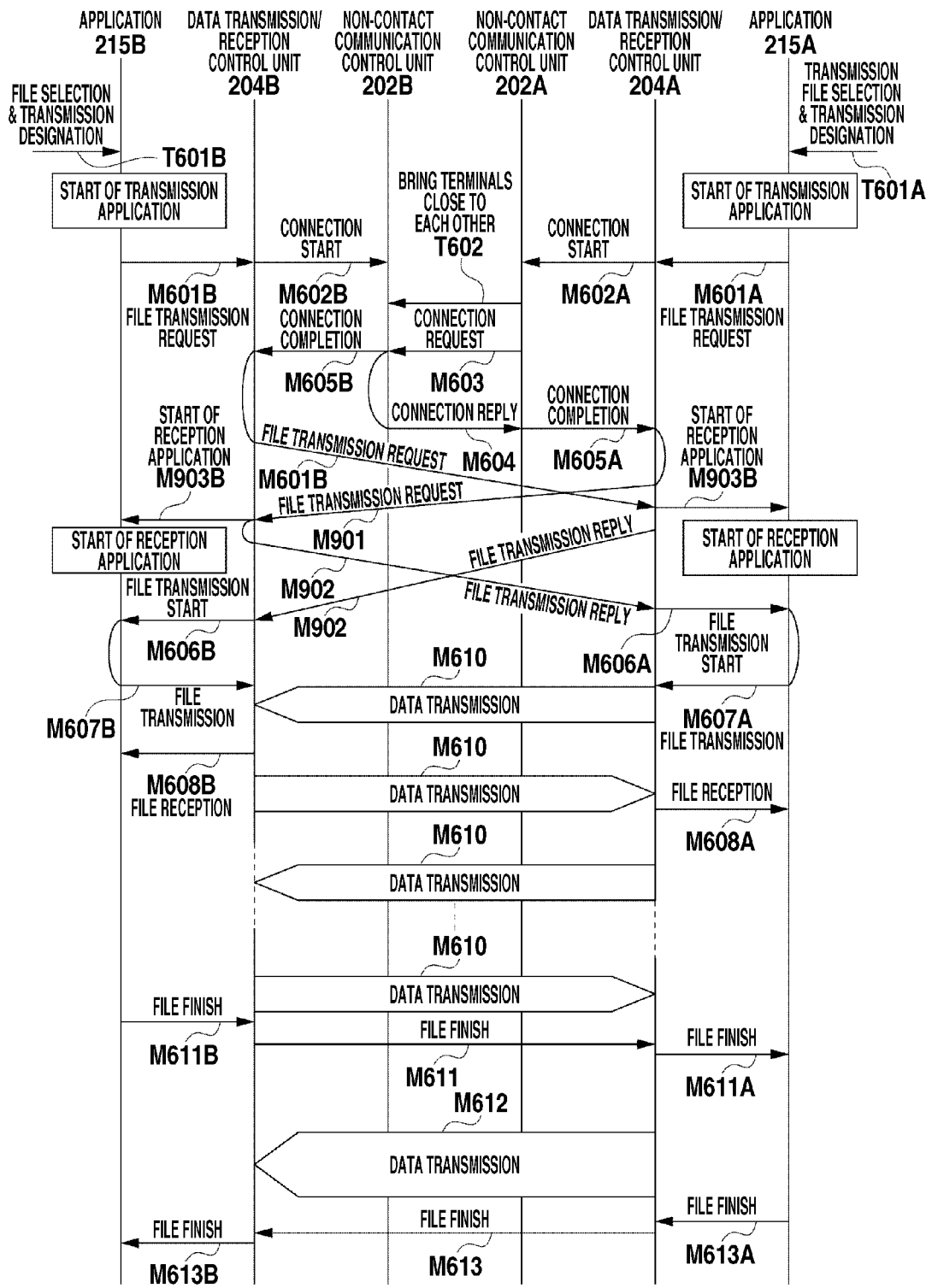
FIG. 9 is a message sequence chart between the data communication terminals 101 according to the second exemplary embodiment.

FIG. 9 is a message sequence chart between the data communication terminals 101A and 101B according to the second exemplary embodiment. In the example of FIG. 9, an operation for transmitting a file is performed on both of the data communication terminals 101A and 101B, and "file division transmission and reception in step S809" is performed. The processes similar to those in FIG. 6 are denoted by the same reference numerals and characters.

A file is specified and transmission operation is performed on the data communication terminal 101A (T601A), and then the transmission application is started. The application 215A notifies the data transmission/reception control unit 204A of the file transmission request (M601A) and then the data transmission/reception control unit 204A notifies the non-contact communication control unit 202A of the connection start message (M602A).

Similarly, a file is specified and transmission operation is performed on the data communication terminal 101B (T601B), and then the transmission application is started. The application 215B notifies the data transmission/reception control unit 204B of the file transmission request (M601B), and then the data transmission/reception control unit 204B notifies the non-contact communication control unit 202B of the connection start message (M602B).

The user brings the data communication terminal 101A close to the data communication terminal 101B (T602) to transmit and receive messages of the connection request (M603) and the connection reply (M604), establishing a link of the non-contact communication 102, which enables data to be transmitted and received.

Similarly to FIG. 6, it is assumed that the non-contact communication control unit 202A of the data communication terminal 101A transmits the connection request (M603), and the non-contact communication control unit 202B of the data communication terminal 101B sends back the connection reply (M604). As a result, the data communication terminal 101A acts as a priority terminal and the data communication terminal 101B acts as a non-priority terminal.

The non-contact communication control unit 202B of the data communication terminal 101B that has received the connection request (M603) notifies the data transmission/reception control unit 204B of the connection completion message (M605B). Similarly, the non-contact communication control unit 202A of the data communication terminal 101A that has received the connection reply (M604) notifies the data transmission/reception control unit 204A of the connection completion message (M605A).

The data transmission/reception control units 204A and 204B of the data communication terminals 101A and 101B that have received the connection completion messages (M605A and M605B) transmit a file transmission request (M901). Furthermore, the data transmission/reception control units 204A and 204B of the data communication terminals 101A and 101B receive the file transmission request (M901) and transmit a file transmission reply (M902).

The data transmission/reception control units 204A and 204B of the data communication terminals 101A and 101B receive the file transmission request (M901) and transmit a message of instructions for starting the reception application to the applications 215A and 215B. The applications 215A and 215B that have received the message of instructions start the reception application.

The data transmission/reception control units 204A and 204B of the data communication terminals 101A and 101B receive the file transmission reply (M902), and notify the applications 215A and 215B of the message of instructions for starting the transmission of a file (M606A and M606B).

The applications 215A and 215B that have received the message of instructions instruct the data transmission/reception control units 204A and 204B to transmit the file (M606A and M606B) using the transmission application that is operating.

The data transmission/reception control units 204A and 204B instructed to transmit the file start the file division transmission and reception. Specifically, the transmission of data with the number of transmission bytes for division transmission and the reception of data with the number of reception bytes for division reception are alternately repeated (M610).

The data transmission/reception control units 204A and 204B of the data communication terminals 101A and 101B that have received the data transmit the file reception notification (M608B).

When the data communication terminal 101B finishes the transmission of the file to be transmitted, the application 215B transmits the file finish notification (M611B) to the data transmission/reception control unit 204B. The data transmission/reception control unit 204B transmits the file finish notification (M611) to the data transmission/reception control unit 204A. The data transmission/reception control unit 204A transmits the file finish notification (M611A) to the application 215A. The data communication terminal 101A receives the file finish notification (M611A) to recognize that the transmission of the file is completed.

When the data communication terminal 101A determines that the reception of the file is completed, the data communication terminal 101A transmits the remaining data of the file to be transmitted (M612). When the transmission of all data is completed, the data communication terminal 101A transmits the file finish notification to the data communication terminal 101B (M613A, M613, and M613B). Thus, data communication is completed between the data communication terminals 101A and 101B.

As described above, in the second exemplary embodiment, the file transmission request indicating that there is a file to be transmitted is first transmitted and received to confirm whether there is data to be transmitted from the other data communication terminal. If there is data transmitted from the other data communication terminal, a role of transmission and reception is switched so that data is alternately transmitted between both of the data communication terminals.

In other words, even if data can be preferentially transmitted, a file is not collectively transmitted and data communication is interrupted during the course of the transmission, which data transmission right is granted to the other data communication terminal.

This causes the other data communication terminal, which is not a non-priority terminal, to start the transmission of data, preventing the user from performing an unnecessary operation while communication is in good order.

Furthermore, it is possible to complete the transmission of data without an error, even if such an application that a time-out error occurs unless the transmission of data is started even though the predetermined time period passes is used.

Depending on an application, a time-out error may occur unless the following data is transmitted within a predetermined time period even though the transmission of data is started, however, data is alternately transmitted and received, so that the above unnecessary operation can be prevented in the present exemplary embodiment.

According to the present exemplary embodiment, even in the communication system in which only any one of transmission and reception can be performed at the same time, a file can be received while a file is being transmitted. Thus, even if the transmission of data is started nearly at the same time in both of the terminals, the user can realize that data is normally transmitted or received from the start of communication.

In the above description of FIG. 8, the processes in steps S803 to S807 are performed and then it is determined whether the size of a file to be transmitted is equal to or larger than a predetermined size in step S305. However, the determination of step S305 may be performed in advance and if the size is equal to or larger than the predetermined size, the processes in steps S803 to S807 is performed. In other words, if the amount of data in a file to be transmitted is equal to or larger than the predetermined size, it is determined whether the other data communication terminal also has a file to be transmitted. If the amount of data is less than the predetermined size, "file collective transmission and reception in step S310" may be performed.

In the above description, although the data communication terminals 101A and 101B notify each other of the transmission of files by transmitting the file transmission request to each other, other methods may be used. For example, the connection request or the connection reply, in which information indicating that there is a file to be transmitted is included, may be transmitted.

If the data communication terminal that has received the file transmission request transmits a file per se, the data communication terminal may transmit the file transmission reply. If the data communication terminal does not transmit a file, the data communication terminal need not transmit the file transmission reply.

The data communication terminal may transmit the file transmission reply indicating that a file is not transmitted. In this case, the terminal that has transmitted the file transmission request determines whether the other data communication terminal also transmits a file by waiting for the file transmission reply transmitted from the other data communication terminal for a certain time or by confirming the contents of the file transmission reply transmitted from the other data communication terminal.

In the first and the second exemplary embodiment, although transmission and reception are switched for each predetermined amount of data in "the division determination processing in step S306," "the succeeding data file division transmission and reception in step S307," and "the file division transmission and reception in step S809," transmission and reception may be switched by a timer.

Although the transmission of data with the predetermined number of transmission bytes for division determination is performed in "the division determination processing in step S306," for example, the transmission of data may be substituted with a processing in which a transmission timer for division determination is provided and the transmission of data is performed until the transmission timer for division determination times out. In other words, the transmission and the reception of data are switched for each predetermined time period to realize the bidirectional transmission of a file.

In the first and the second exemplary embodiment, data transmitted from the application 215 to the data transmission/reception control unit 204, for example, is stored in a buffer, however, the overflow of data from the buffer may result in losses in a part of file data. In particular, the above problem may occur while data is being received from the other data communication terminal.

To avoid the problem, if data to be transmitted is equal to or larger than a first threshold in a data division transmission and reception processing, a division data transmission is started even while division data is being received, and the division data transmission is continued until data to be transmitted is smaller than a second threshold. This prevents losses in data transmitted from the data communication terminal.

In the description of the first and the second exemplary embodiment, although it is assumed that the data communication terminal that has transmitted the connection request acts as a priority terminal and the data communication terminal that has transmitted the connection reply acts as a non-priority terminal, this may be reversed. Although the priority terminal or the non-priority terminal is determined depending on whether the data communication terminal transmits the connection request, this may be determined by using other different methods.

For example, negotiation is performed between the terminals after the transmission and the reception of the connection request and the connection reply to determine a relationship between the priority terminal and the non-priority terminal. Although the first and the second exemplary embodiments deal with the non-contact communication 102, the first and the second exemplary embodiment are also applicable to wire or wireless communication provided that a communication system is used in which the non-priority terminal waits for transmission of data while the priority terminal is transmitting data.

As described above, according to the exemplary embodiments, in a communication system in which a priority terminal is shorter than a non-priority terminal in a standby time required until the terminal starts data communication after detecting that a communication medium is idle, a data communication terminal operating as a priority terminal can preferably control data communication.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-149060 filed Jun. 23, 2009, which is hereby incorporated by reference herein in its entirety.

What is claimed is:

1. An apparatus in a system in which a priority terminal has a standby time that is shorter than a standby time of a non-priority terminal, wherein the standby times are the times required until the respective terminals start data transmission after detecting that a communication medium is idle, the apparatus comprising:
a transmission request unit configured to request transmission of data, wherein the transmission request causes the apparatus to send a connection request to another apparatus;
a first determination unit configured to determine an amount of data to be transmitted from the apparatus to the another apparatus in a case where the apparatus is operating as the priority terminal; and
a control unit configured to perform control for allowing the another apparatus, which is operating as the non-priority terminal, to transmit data according to the determined amount of data,
wherein the priority terminal sends the connection request before the non-priority terminal sends the connection request.

2. The apparatus according to claim 1, wherein, if the determined amount of data is greater than a predetermined value, the control unit interrupts the transmission of data at least once until the transmission of data is completed, and if the determined amount of data is smaller than the predetermined value, the control unit continues the transmission of data until the transmission of data is completed.

3. The apparatus according to claim 1, further comprising a second determination unit configured to determine whether there is data to be transmitted from the another apparatus,
wherein the control unit controls interruption of transmission of data until the apparatus completes the transmission of data according to the determination results obtained by the first and second determination units.

4. The apparatus according to claim 3, wherein, if the second determination unit determines that there is no data to be transmitted, the control unit continues the transmission of data without interrupting the transmission of data irrespective of the amount of data to be transmitted from the apparatus.

5. The apparatus according to claim 3, wherein the second determination unit interrupts the transmission of data to determine whether there is data to be transmitted and received from the another apparatus during the interruption.

6. The apparatus according to claim 3, wherein the second determination unit determines whether a message is received.

7. The apparatus according to claim 1, wherein the control unit switches and repeats data transmission and interruption of the data transmission in order to alternately perform the transmission of data from the apparatus and reception of data from the another apparatus.

8. The apparatus according to claim 7, wherein the control unit switches between the data transmission and the interruption of the data transmission for each predetermined amount of data or for each predetermined time period.

9. The apparatus according to claim 1, further comprising a third determination unit configured to determine whether the apparatus operates as the priority terminal or the non-priority terminal depending on which one of the connection request or a connection reply for establishing a wireless communication link is transmitted by the apparatus,
wherein, if the third determination unit determines that the apparatus operates as the priority terminal, the control unit performs communication control.

10. A method of controlling an apparatus in a system in which a priority terminal has a standby time that is shorter than a standby time of a non-priority terminal, wherein the standby times are the times required until the respective terminals start data communication after detecting that a communication medium is idle, the method comprising:
requesting transmission of data;
sending a connection request to another apparatus based on the transmission request;
determining an amount of data to be transmitted from the apparatus to the another apparatus in a case where the apparatus operates as the priority terminal; and
performing control for causing the another apparatus, which is operating as the non-priority terminal, to transmit data to the apparatus according to the determined amount of data,
wherein the priority terminal sends the connection request before the non-priority terminal sends the connection request.

11. A non-transitory computer-readable storage medium storing a computer program for causing a computer to execute a method of controlling an apparatus in a system in which a priority terminal has a standby time that is shorter than a standby time of a non-priority terminal, wherein the standby times are the times required until the respective terminals start data communication after detecting that a communication medium is idle, the control method comprising:
requesting transmission of data;
sending a connection request to another device based on the transmission request;
determining an amount of data to be transmitted from the apparatus to another apparatus in a case where the apparatus operates as the priority terminal; and
performing control for causing the another apparatus, which is operating as the non-priority terminal, to transmit data to the apparatus according to the determined amount of data,
wherein the priority terminal sends the connection request before the non-priority terminal sends the connection request.

12. An apparatus in a system in which a priority terminal has a standby time that is shorter than a standby time of a non-priority terminal, wherein the standby times are the times required until the respective terminals start data transmission after detecting that a communication medium is idle, the apparatus comprising:
a first determination unit configured to determine an amount of data to be transmitted from the apparatus to another apparatus in a case where the apparatus is operating as the priority terminal;
a control unit configured to perform control for allowing the another apparatus, which is operating as the non-priority terminal, to transmit data according to the determined amount of data; and a second determination unit configured to determine whether there is data to be transmitted from the another apparatus, wherein the control unit controls interruption of transmission of data until the apparatus completes the transmission of data according to the determination results obtained by the first and second determination units, and wherein, if the second determination unit determines that there is no data to be transmitted, the control unit continues the transmission of data without interrupting the transmission of data irrespective of the amount of data to be transmitted from the apparatus.

13. A method of controlling an apparatus in a system in which a priority terminal has a standby time that is shorter than a standby time of a non-priority terminal, wherein the standby times are the times required until the respective terminals start data transmission after detecting that a communication medium is idle, the method comprising:

determining an amount of data to be transmitted from the apparatus to another apparatus in a case where the apparatus operates as the priority terminal;

performing control for causing the another apparatus, which is operating as the non-priority terminal, to transmit data to the apparatus according to the determined amount of data;

determining whether there is data to be transmitted from the another apparatus;

controlling interruption of transmission of data until the apparatus completes the transmission of data according to the determination results obtained by determining the amount of data to be transmitted and determining whether there is data to be transmitted from the another apparatus; and if it is determined that there is no data to be transmitted, continuing the transmission of data without interrupting the transmission of data irrespective of the amount of data to be transmitted from the apparatus.

14. A non-transitory computer-readable storage medium storing a computer program for causing a computer to execute a method of controlling an apparatus in a system in which a priority terminal has a standby time that is shorter than a standby time of a non-priority terminal, wherein the standby times are the times required until the respective terminals start data communication after detecting that a communication medium is idle, the method comprising:

determining an amount of data to be transmitted from the apparatus to another apparatus in a case where the apparatus operates as the priority terminal;

performing control for causing the another apparatus, which is operating as the non-priority terminal, to transmit data to the apparatus according to the determined amount of data;

determining whether there is data to be transmitted from the another apparatus;

controlling the interruption of transmission of data until the apparatus completes the transmission of data according to the determination results obtained by determining the amount of data to be transmitted and determining whether there is data to be transmitted from the another apparatus; and if it is determined that there is no data to be transmitted, continuing the transmission of data without interrupting the transmission of data irrespective of the amount of data to be transmitted from the apparatus.

15. The apparatus according to claim 12, wherein, if the determined amount of data is greater than a predetermined value, the control unit interrupts the transmission of data at least once until the transmission of data is completed, and if the determined amount of data is smaller than the predetermined value, the control unit continues the transmission of data until the transmission of data is completed.

16. The apparatus according to claim 12, wherein the second determination unit interrupts the transmission of data to determine whether there is data to be transmitted and received from the another apparatus during the interruption.

17. The apparatus according to claim 12, wherein the second determination unit determines whether a message is received.

18. The apparatus according to claim 12, wherein the control unit switches and repeats data transmission and interruption of the data transmission in order to alternately perform the transmission of data from the apparatus and reception of data from the another apparatus.

19. The apparatus according to claim 18, wherein the control unit switches between the data transmission and the interruption of the data transmission for each predetermined amount of data or for each predetermined time period.

20. The apparatus according to claim 12, further comprising a third determination unit configured to determine whether the apparatus operates as the priority terminal or the non-priority terminal depending on which one of a connection request or a connection reply for establishing a wireless communication link is transmitted by the apparatus, wherein, if the third determination unit determines that the apparatus operates as the priority terminal, the control unit performs communication control.

* * * * *